Aug. 4, 1970     J. W. EDWARDS ET AL     3,523,179
SELECTIVE TRANSMITTER FOR INFRARED HEATERS
Original Filed Dec. 26, 1963     2 Sheets-Sheet 1
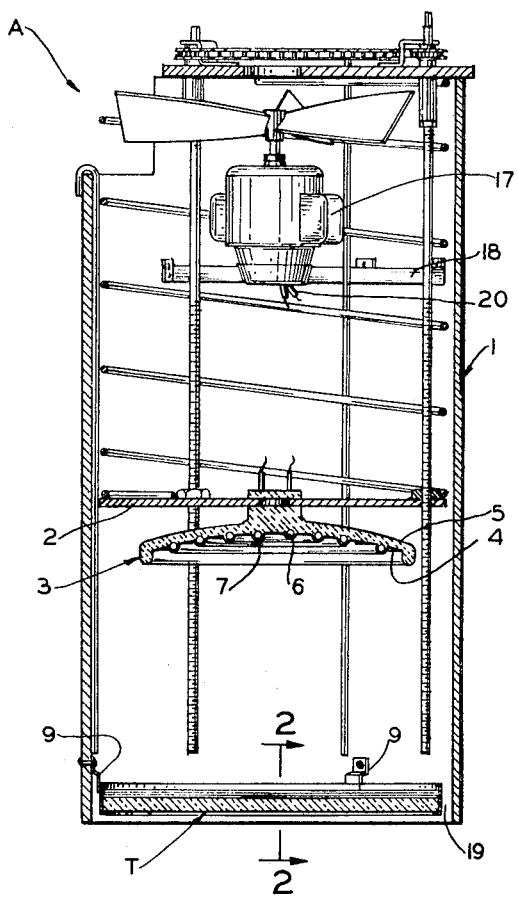
FIG. 1
FIG. 2
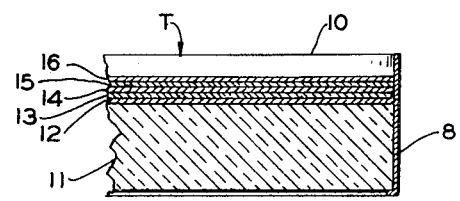
INVENTOR.
JAMES W. EDWARDS
RICHARD K. SHELBY
BY
ATTORNEY

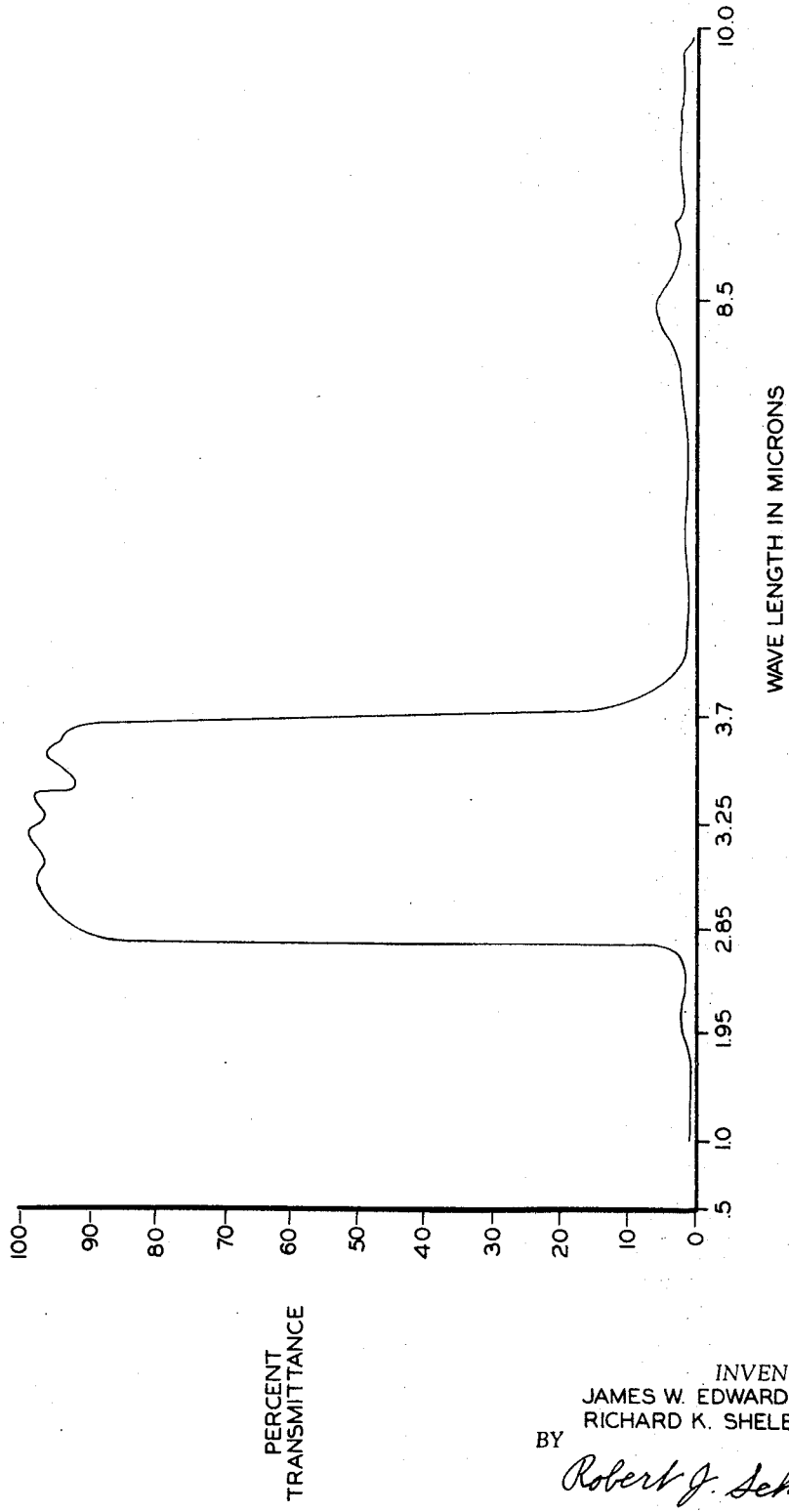

United States Patent Office 3,523,179
Patented Aug. 4, 1970

3,523,179
SELECTIVE TRANSMITTER FOR INFRARED HEATERS
James W. Edwards, Foster City, San Mateo, Calif., and Richard K. Shelby, Chicago, Ill., assignors to Monsanto Company, St. Louis, Mo., a corporation of Delaware
Continuation of application Ser. No. 726,023, May 2, 1968, which is a division of application Ser. No. 641,399, Mar. 20, 1967, which in turn is a division of application Ser. No. 333,468, Dec. 26, 1963. This application Mar. 27, 1969, Ser. No. 812,962
The portion of the term of the patent subsequent to July 18, 1984, has been disclaimed
Int. Cl. G02b 5/28
U.S. Cl. 219—354         4 Claims

ABSTRACT OF THE DISCLOSURE

A heating device for molding machines which form articles from thermoplastic sheet-material, wherein the heating device comprises a vertically elongated housing having a highly reflective inner surface and having a downwardly facing concave electric radiant heater vertically adjustably mounted therein. A transmitter consisting of alternating layers of germanium and cryolite substantially spans the lower open end of said housing and is designed to preferentially transmit infrared radiation within a wavelength range of 2.85 to 3.75 microns. A fan is provided to draw cooling air upwardly through the housing past the peripheries of the transmitter and the heater.

---

This application is a continuation of application Ser. No. 726,023, May 2, 1968, now abandoned, which is a division of our copending application Ser. No. 641,399, filed Mar. 20, 1967, now abandoned, which is in turn, a division of application Ser. No. 333,468, filed Dec. 26. 1963, now U.S. Pat. No. 3,331,941.

This invention relates in general to certain new and useful improvements in infrared heaters and more particularly to an infrared heater having selective transmitting means.

In recent years, it has become a common practice in the manufacture of thin-walled disposable containers such as cups and dishes, to employ thermoplastic materials such as styrene, polystyrene and modified polystyrene as the material of construction. These materials are particularly adaptable for use in molding machines of the type described in United States Letters Patent No. 2,967,328 wherein a sheet of thermoplastic material is passed between a pair of cooperating die elements. In this operation, a selected area of the thermoplastic material is formed within a cavity of one of the die elements. However, this material must be preheated to a desired temperature immediately prior to the molding operation to the point where it is sufficiently flexible and viscous so as to be formable within the die elements.

The prior art has provided many methods and heaters such as calrod heaters for preheating the sheets of thermoplastic materials. These hetaers are relatively inefficient since they are not compatible with the thermoplastic material and moreover, are not designed to emit radiation within the wavelength range of absorptivity of the web of thermoplastic material. In an effort to reduce the power consumption and the excess heat created by the preheaters of the prior art, many designers have attempted to design heaters which are capable of emitting radiation within selected wavelength ranges, these wavelength ranges being selected to cover the wavelength range of absorption of the web of thermoplastic material. However, studies of spectral distribution curves for available sources of energy have shown that practically all heaters emit radiation within a wide spectral range and that it is very difficult to concentrate the heat in any particular spectral region. As a result thereof, the selective heaters of the prior art have been relatively inefficient and did not overcome the problems that they were designated to obviate.

It is therefore, the primary object of the present invention to provide a heater which is capable of emitting radiation within a relatively narrow spectral wave length range.

It is another object of the present invention to provide a heater of the type stated which is relatively efficient and has a low power consumption.

It is a further object of the present invention to provide a selective transmitter with the aforementioned heater for selectively transmitting radiation within a selected wavelength range.

It is an additional object of the present invention to provide a selective transmitter of the type stated which can be manufactured at a low unit cost and is capable of withstanding relatively high temperatures.

It is another salient object of the present invention to provide a selective transmittter of the type stated which has a high efficiency rating for selectively transmitting designed wavelength ranges.

With the above and other objects in view, our invention resides in the novel features of form, construction, arrangement, and combination of parts presently described and pointed out.

In the accompanying drawings (2 sheets):

FIG. 1 is a vertical sectional view showing a heater and a selective transmitter suitably mounted within a heater housing;

FIG. 2 is a vertical fragmentary sectional view taken along line 2—2 of FIG. 1; and FIG. 3 is a graphical illustration of a typical transmittance curve showing a percentage of transmitted radiation from the heater for a given wavelength range of radiation when the radiation is passed through a selective transmitter constructed in accordance with the present invention.

Generally speaking, the present invention relates to a selective transmitter which is used in conjunction with the heating apparatus described in copending application Ser. No. 333,508, filed Dec. 26, 1963, now U.S. Pat. No. 3,325,629. In this aforementioned copending patent applictaion, the heater is designed to emit radiation within the wavelength range of from 3.2 to 3.5 microns, which is the wavelength range most compatible for the thermoplastic material also described in said aforementioned copending patent application.

The selective transmitter of the present invention generally consists of a substrate which is transparent at least within the wavelength range of 3.2 to 3.5 microns and having a series of alternating layers of materials having high and low refractive indices respectively, applied to one of its flat surfaces.

Referring now in more detail and by reference characters, to the drawings, A designates a heating device comprising a heater housing 1, which is more fully described in the aforementioned copending patent application Ser. No. 333,508. Operatively mounted on a shiftable plate 2 is a heater 3 also described more fully in the aforementioned copending patent application. However, it will suffice to point out for purposes herein,that the plate 2 is shiftable within the housing 1 for the greater portion of its length and the heater 3 which is rigidly mounted on the plate 2 is carried therewith.

It can be seen by reference to FIG. 1 that the heater 3 has an inverted dish-shaped vertical cross section with an arcuately shaped downwardly presented concave bottom wall 4 and a matching top wall 5. By further reference to FIG. 1, it can be seen that the heater 3 is integrally formed with a series of connecting channels 6 for accommodating a continuous coil heater wire or emitter 7, which is ultimately connected to a suitable source of electrical current (not shown). It can be seen that the heater wire 7 is located so that it is displaced from a horizontal plane coincident with the peripheral margin of the heater casing at various distances. Accordingly, the portion of the heater wire 7 along the peripheral margin of the casing is substantially coincident with this horizontal plane, whereas the portion of the heater wire 7 located at the geometric center of the bottom wall 4 is displaced from the horizontal plane. Moreover, the portions of the heater wire 7 which are located between the geometric center of the bottom wall 4 and the peripheral margin thereof are displaced from the horizontal plane coincident with the peripheral margins of the bottom wall 4 by a distance which is linearly proportional to the radial displacement from the peripheral margins. By means of this construction, it is possible to eliminate the tendency of the radiation to concentrate and cause local hot spots on a receiver such as a web of thermoplastic material.

The thermoplastic material which is designed to be used with the heater 3 is also more fully described in the aforementioned copending patent application and is generally designed to accommodate radiation within the wavelength range of 3.2 to 3.5 microns. Accordingly, the heater 3 is designed to emit radiation within this wavelength range. However as previously pointed out, the heaters of the aforementioned type are not 100% efficient and consequently there is emission of radiation at wavelengths less than 3.2 microns and at wavelengths greater than 3.5 microns. In effect, there is no scientific method for producing a heater which is tuned to deliver a preponderance of its radiation in any micron band. However, the heater 3 has been found to be far more successful than any of the heaters now in the prior art.

In order to increase the efficiency of the heater 3, a transmitter T is rigidly mounted at the lower end of the housing 1 and is designed to minimize transmission of radiation from the heater 3 which is not contained within the wavelength range of 2.85 to 3.75 microns. The transmitter T includes a cylindrical supporting ring 8, preferably formed of aluminum and which is provided with a plurality of radially spaced upstanding brackets 9 for securement to the interior surface of the cylindrical sidewall of the housing 1. The supporting ring 8 is designed to retain a dichroic filter 10 which is supported by a transparent quartz substrate 11, substantially as shown in FIG. 2. While the substrate 11 selected is quartz, it should be understood that any medium which is transparent within the wavelength range of 3.2 to 3.5 microns could be employed. The filter 10 which is of the multilayer film type, is suitably applied to the undersurface of the quartz substrate 11 by any suitable method of depositing thin layers. The filter 10 consists of alternating layers of germanium and cryolite. A germanium layer 12, which is a high index of refraction material, is facewise deposited on one flat surface of the substrate 11. A layer of cryolite 13 having a low index of refraction is then facewise deposited on the surface of the germanium layer 12. This is followed by identical layers 14, 15 of germanium and cryolite respectively and which are identical to the layers 12, 13 respectively. Finally, the filter 10 is terminated with an outer layer of germanium 16. Each of the germanium layers is designed so that they have an optical thickness of ½ wavelength for the center of the wavelength range to be reflected. Each of the cryolite layers is designed with an optical thickness of ¼ wavelength for the center of the wavelength range to be reflected. In the case of the present invention, it is desired to transmit radiation within the wavelength range of 3.2 to 3.5 microns and reflect radiation having a wavelength less than 3.2 microns and radiation having a wavelength greater than 3.5 microns. Consequently, the optical thickness of each of the layers forming part of the filter 10 was designed with respect to a transmitted wavelength of 3.35 microns. The substrate 11 is of sufficient thickness so that it constitutes a "massive" layer and therefore, does not interfere with the transmission of radiation in the system.

The transmitter T of the present invention is suitably designed for use with the heating system and compositions of the present invention, the compositions of which are hereinafter described. While it is recognized that no transmitter heretofore developed has been 100% efficient, the transmitter T has achieved a high degree of efficiency in the present invention. It is designed to provide transmission of radiation within the wavelength range of 2.85 to 3.7 microns which is slightly greater than the wave length range of 3.2 to 3.50 microns. The filter, however, is only highly reflective within the wavelength range of 1.95 to 2.85 microns and 3.7 to 8.5 microns, but is not reflective as to radiation having a wavelength of less than 1.95 or to radiation having a wavelength greater than 8.5 microns. However, due to the highly reflective nature of the metallic germanium, this material is highly opaque at wavelengths less than 1.98 microns and is therefore highly reflective when the wavelength range is less than 1.98 microns. Moreover, the quartz substrate is relatively opaque beyond 4½ microns, and therefore becomes highly reflective. Therefore, it can be seen that the transmitter T is designed to provide maximum transmittance within a passband range of 2.85 to 3.75 microns and will effectively reflect any radiation which is not within this passband range. The reflective radiation which is held within the housing 1, is reabsorbed as heat and then reemitted in the full spectrum. In other words, the energy which is not contained within the transmission band is recycled and with each cycle is partially converted to the desired wave length range and thereby materially increases the efficiency of the heater 3. Due to the fact that the housing 1 is constructed of aluminum, it is a good conductor of heat and the radiation which is not included in the passband range and is reflected back into the housing can be dissipated through the walls of the housing 1, if it is not absorbed. It may be desirable to coat the filter 10 with a silicon monoxide or silicon dioxide coating to protect the same from the high temperature maintained by the heater 3.

When the aforementioned heater assemblies are employed in molding machines of the type described in United States Letter Patent 2,967,328, it may not be possible to dissipate the heat collected within the housing 1 as rapidly as desirable. Accordingly, a relatively small conventional electric fan 17 is suitably mounted on a web consisting of three radially extending arms 18, which are secured to the interior surface of the housing 1. By reference to FIG. 1, it can be seen that the fan 17 is of the exhaust type and is mounted in upwardly spaced relation to the plate 2 and heater 3. The transmitter T has a slightly smaller diametral size than the housing 1, thereby providing an air space 19 through which air can pass. The fan 17 is also provided with a pair of electrical conductors 20 for ultimate connection to a siutable source of electrical current ((not shown). Thus when the fan 17 is actuated, it will pull cooling air through the space 19, around the heater 3, and exhaust the same through the upper end of the housing 1. In this manner, it is possible to vent some of the collected heat within the housing 1.

It should be understood that the transmitter T could be located at any position with respect to the heater 3 and does not necessarily have to be mounted in close proximity to the lower margin of the housing 1. However, it is, of course, necessary that the transmitter T have a diametral size which is approximately equal to the diametral size of the housing 1 so that all radiation emitted from the heater 3 will contact the transmitter T, but which is at least sufficient to afford the air space 19.

The transmitter T can also be conveniently used in beam splitters, reflectors for optical instruments, one way mirrors, and even sunglasses or similar types of optical devices where it is desirable to alter the properties of radiation from an emitter.

FIG. 3 is a graphical illustration of a typical transmittance curve for the transmitter T when used in combination with the heater 3. This curve shows the plot of the percentage of transmitted radiation from the heater as a function of the wave length of radiation in microns. It can be seen by reference to this transmittance curve, that when the radiation is directed thereupon, at an angle of incidence of 0°, approximately 95% of the radiation contained within the wavelength range of 2.85 to 3.70 microns was transmited. Beyond the range of 3.70 microns and at wavelengths less than 2.85 microns, virtually all of the radiation was reflected. It is true that beyond 8.5 microns a small amount of radiation was transmitted through the filter. However, at this wavelength range, the power consumed to produce this radiation and the ultimate heat loss is very small.

The plot of FIG. 3 decidedly illustrates the advantage of employing the transmiter T in radiation systems of the type described. It can be seen that practically all of the radiation which is not contained within the passband region is recycled into the heater housing 1. This radiation is then partially converted to the desired wavelength range and emitted in the selected passband range. With this construction, the effectiveness and the efficiency of the heater 3 is materially increased. It should also be noted that while the transmittance curve shows a number of ripples or so-called subsidiary reflectance maxima in the passband range, these reflectance maxima are considerably reduced with the transmitter T.

It should be understood that changes and modifications can be made in the form, construction, arrangement and combination of parts presently described and pointed out without departing from the nature and principle of our invention.

Having thus described our invention, what we desire to claim and secure by Letters Patent is:

1. A transmitter for use in an infrared heating apparatus used in the heating of thermoplastic sheets to be shaped and where the transmitter is used with an emitter designed to emit infrared radiation preferentially in the range of 2.85 to 3.7 microns; said transmitter comprising a substrate which is substantially transparent in the wavelength range of radiation to be transmitted by said transmitter, said substrate being highly opaque to wavelengths of radiation greater than 4.5 microns, and a selective transmitting filter on said substrate comprising at least one-half wavelength layer of germanium which is highly opaque to wavelengths of radiation less than 1.98 and at least one-quarter wavelength layer of cryolite based on a wavelength of 3.25 microns for preferentially transmitting radiation in the wavelength range of 2.85 to 3.7 microns.

2. A transmitter for use in an infrared heating apparatus used in the heating of thermoplastic sheets to be shaped and where the transmitter is used with an emitter designed to emit infrared radiation preferentially in the range of 2.85 to 3.7 microns; said transmitter comprising a substrate which is substantially transparent in the wavelength range of radiation to be transmitted by said transmitter, said substrate being highly opaque to wavelengths of radiation greater than 4.5 microns, and a selective transmitting filter on said substrate comprising alternating half wavelength layers of germanium which is highly opaque to wavelengths of radiation less than 1.98 and alternating quarter wavelength layers of cryolite based on a wavelength of 3.25 microns for preferentially transmitting radiation in the wavelength range of 2.85 to 3.7 microns.

3. The transmitter of claim 2 further characterized in that the filter comprises three alternating half wavelength layers of germanium and two alternating quarter wavelength layers of cryolite based on a wavelength of 3.25 microns for preferentially transmitting radiation in the wavelength range of 2.85 to 3.7 microns.

4. The transmitter of claim 2 further characterized in that the transmitter is highly opaque to radiation having a wavelength of less than 1.9 microns and to radiation beyond 4.5 microns.

References Cited

UNITED STATES PATENTS

| | | | |
|---|---|---|---|
| 2,412,496 | 12/1946 | Dimmick | 350—166 |
| 2,552,184 | 5/1951 | Koch | 350—166 X |

FOREIGN PATENTS

| | | |
|---|---|---|
| 896,736 | 3/1962 | Great Britain. |

RALPH F. STAUBLY, Primary Examiner

U.S. Cl. X.R.

219—553; 350—166